United States Patent Office 3,257,802
Patented June 28, 1966

3,257,802
METHOD OF HYBRID HIGH SPECIFIC IMPULSE PROPULSION USING LITHIUM - POLYETHYLENE SOLID WITH CHLORINE CONTAINING OXIDIZERS
Martin H. Kaufman, China Lake, Calif., assignor to the United States of America as represented by the Secretary of the Navy
No Drawing. Filed Mar. 13, 1964, Ser. No. 352,431
3 Claims. (Cl. 60—35.4)

The invention herein described may be manufactured and used by or for the Government of the United States of America for governmental purposes without the payment of any royalties thereon or therefor.

The present invention relates to a new and valuable high specific impulse propellant.

In the field of propellant chemistry specific impulse and boost velocity are the two criteria most widely used in evaluating a good propellant. Present day propellants deliver about 245 seconds (theoretical) 266 seconds. The general purpose of this invention is to produce a propellant with theoretical impulse of about 300 seconds.

It is therefore an object of this invention to provide a propellant with high energy value which helps to give high specific impulse for use in rocket motors.

Another object is to provide a propellant composition which has low molecular weight combustion products for use in modern missile systems.

A further object is to provide a method of preparing a rocket propellant composition which has the economic advantages of being inexpensive and easily manufactured with existing facilities and equipment.

Still another object of this invention is to provide a propellant which will find use in hybrid propellant systems.

Other objects, features, and many of the attendant advantages of this invention will become readily appreciated as the same become better understood by reference to the following detailed description.

The present invention comprises a propellant which consists of two parts, the solid fuel phase and the liquid oxidizer phase. The solid phase or component consists of lithium metal and a hydrocarbon binder such as polyethylene, polyisobutylene and ethylene propylene copolymer. The liquid phase or component consists of a member selected from a group of liquid oxidizers which react readily with lithium; for example, nitric acid, chlorine trifluoride and perchlorofluoride.

The following examples will better illustrate this invention but should not be considered as limiting.

*Example I*

Constituents—
  (a) Solid phase:                   Percent by weight
      Lithium _____ 40
      Polyethylene _____ 60
  (b) Liquid phase:                Ratio—liquid/solid
      Chloride trifluoride _____ 75/25

The lithium metal was melted and mixed into molten polyethylene. These two materials were stirred in a rocket motor tube at a temperature of about 200° C. until a homogeneous mixture resulted. The mixture was then permitted to solidify at room teperature. The solid loaded motor tube was now loaded into a test hybrid rocket motor and the liquid phase consisting of chlorine trifluoride was sprayed thereon in a ratio of about 75 parts liquid to 25 parts solid, whereby combustion took place. The motor burned smoothly.

*Example II*

Constituents—
  (a) Solid phase:                   Percent by weight
      Lithium _____ 30
      Polyhydrocarbon _____ 70
  (b) Liquid phase:                Ratio—liquid/solid
      Perchlorofluoride (containing 5–10%
        chlorine trifluoride) _____ 70/30

As described herein the lithium was first melted and mixed into the polyhydrocarbon, polyethylene until a homogeneous mixture resulted. The mixture in a motor tube was allowed to cure at room temperature. Upon loading into a hybrid rocket motor the liquid phase consisting of perchlorofluoride was sprayed or injected onto the solid fuel. This motor fired with the oxidizer, perchlorofluoride, burned smoothly.

The fuel or solid phase of this invention may consist of lithium and a member selected from the following group of hydrocarbons consisting of polyethylene, polyisobutylene, ethylenepropylene and other suitable copolymer materials.

The liquid phase may be any liquid oxidizer known to react readily with lithium such as nitric acid, chlorine trifluoride, and perchlorofluoride. As liquid oxidizers containing $-NF_2$ group become available, they will provide even higher energy. For reasons of vapor pressure lowering mixtures of oxidizers may be used; e.g., chloride trifluoride, perchlorofluoride and nitrogen tetrafluoride.

Obviously many modifications and variations of the present invention are possible in the light of the above teachings. It is therefore to be understood that within the scope of the appended claims the invention may be practiced otherwise than as specifically described.

What is claimed is:
1. The method of increasing the specific impulse developed by ejecting from a combustion chamber the gaseous products produced by combustion of a solid propellant comprising from 30 to 40 percent by weight lithium and from 60 to 70 percent by weight polyethylene, comprising
    injecting chlorine trifluoride in a ratio of from 70 to 80 parts by weight to from 20 to 30 parts by weight solid propellant into said combustion chamber.
2. The method of increasing the specific impulse developed by burning a fuel and oxidizer in the combustion chamber of a hybrid rocket motor comprising
  (a) providing a solid fuel consisting of 40 percent by weight lithium and 60 percent by weight polyethylene in a combustion chamber and
  (b) injecting a liquid oxidizer consisting of chlorine trifluoride onto said fuel in a ratio of 75 parts by weight oxidizer to 25 parts by weight solid fuel.
3. The method of claim 2 wherein the oxidizer is perchlorofluoride.

References Cited by the Examiner
UNITED STATES PATENTS

| | | | |
|---|---|---|---|
| 2,791,883 | 5/1957 | Moore et al. | 149—87 X |
| 3,083,526 | 4/1963 | Hudson | 60—35.4 |
| 3,158,991 | 12/1964 | D'Alelio | 60—35.4 |
| 3,158,993 | 12/1964 | Hodgson | 60—35.4 |
| 3,158,994 | 12/1964 | Hodgson | 149—2 X |

LEON D. ROSDOL, *Primary Examiner.*
BENJAMIN R. PADGETT, *Examiner.*